3,464,862
METHOD OF MAKING FUEL CELL ELEC-
TRODE AND FUEL CELL INCORPORAT-
ING THE ELECTRODE
John Perry, Jr., New Shrewsbury, N.J., assignor to the United States of America as represented by the Secretary of the Army
No Drawing. Filed Apr. 28, 1967, Ser. No. 635,964
Int. Cl. H01m 27/08, 27/30
U.S. Cl. 136—86                    2 Claims

ABSTRACT OF THE DISCLOSURE

A fuel cell electrode is made particularly for use in a hydrazine-air fuel cell system by reducing ferrous chloride in aqueous solution with sodium borohydride to produce fine particles of iron on a porous sintered nickel substrate.

Background of the invention

This invention relates generally to fuel cells and more particularly to hydrazine-air fuel cells, to a fuel cell electrode for use in such a fuel cell, and to a method of making the fuel cell electrode.

Fuel cells using hydrazine as a fuel have received much attention in recent years due to the high energy levels obtained. Presently, only noble metal catalysts have been used as the fuel electrode for the oxidation of hydrazine and other fuels, such as hydrogen and methanol, in fuel cell systems.

The principal object of this invention is to provide an inexpensive non-noble metal catalyst for the oxidation of hydrazine in the hydrazine-air fuel cell system. A further object of the invention is to provide a method of making a fuel electrode including the inexpensive non-noble metal catalyst. A still further object of the invention is to provide a fuel cell in which the cost of catalyst materials is reduced, and which is characterized by both a high fuel efficiency and high current densities.

Summary of the invention

It has now been found that the foregoing objects can be attained by providing a fuel cell electrode made by reducing ferrous chloride in aqueous solution with sodium borohydride to produce fine particles of iron on a porous sintered nickel substrate.

Particularly, the fuel cell electrode can be made by first impregnating the pores of a porous sintered nickel plaque with a suitable iron containing solution, as for example, a ferrous chloride solution having a concentration of 100 grams of ferrous chloride in 100 milliliters of water. The particular plaque used consisted of nickel powder sintered onto a nickel screen and measured 1⅛" x 1⅛" x 0.030". The impregnation of the nickel plaque is accomplished by placing the nickel plaque in a vessel containing the iron salt solution and then evacuating air from the system, thus allowing the solution to fill the pores of the substrate. The plaque, saturated with ferrous chloride, is shaken slightly to remove excess solution and then immersed for about 20 to 30 seconds in a 2 percent solution of sodium borohydride in water. The plaque is removed and washed several times with hot distilled water to remove traces of unreacted sodium borohydride and sodium chloride formed. After washing, the plaque is dried for several hours at a temperature of 120° to 140° C. in a non-oxidizing atmosphere as, for example, in an argon atmosphere. The reaction produces a finely divided black precipitate which X-ray analysis shows to be of alpha iron patterns, indicating that the following reaction is probably involved:

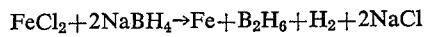
$$FeCl_2 + 2NaBH_4 \rightarrow Fe + B_2H_6 + H_2 + 2NaCl$$

The fuel cell electrode thus prepared is incorporated in a hydrazine-air fuel cell system in the following manner. A conventional oxidant electrode is used such as a ⅛ inch thick carbon electrode with spinel catalyst (Ag-Co-Al) and wet proofed with paraffin. The fuel electrode and oxidant electrode is connected with a liquid junction; the two half cells (fuel electrode and reference electrode) being bolted together with an ion exchange membrane in between. The ion exchange membrane serves to prohibit oxygen leakage from the oxidant electrode to the fuel electrode, thus allowing for more accurate gas evolution measurements at the fuel electrode. A suitable fuel, for example, 3 molar hydrazine monohydrate is mixed with a suitable electrolyte, for example, 5 molar potassium hydroxide and supplied to the fuel compartment by gravity flow from an externally connected reservoir. During operation, the nitrogen gas generated by the reaction lifts the mixture of fuel and electrolyte back into the reservoir, thus providing recirculation for the cell. When operating at elevated temperatures, the fuel is preheated in the reservoir and then fed to the cell.

The fuel cell, as above described, is found to give current densities equal to that of palladium catalyst. That is, anodic current densities of 100 milliamperes per square centimeter at 0.060 volt polarization is obtained at temperatures of 60° C. with 3 M $N_2H_4 \cdot H_2O$ in 5 M KOH. The fuel electrode is operated well over 200 hours at 100 ma./cm.² thus showing stable performance. The initial anode potential vs. SCE under load is −1.20 v. This voltage is maintained with little variation through the life testing.

The fuel electrode of the invention is characterized by a faradaic fuel efficiency of 98 percent as compared to other metal catalysts of 89 percent and lower. This fuel utilization is an important factor in practical fuel cell systems from a logistical standpoint. Moreover, the iron catalyst on the nickel plaque retards the self-decomposition of hydrazine during the oxidation process.

The foregoing description is considered to be merely as illustrative of the invention and not in limitation thereof.

What is claimed is:
1. A method of making a fuel electrode for use in a hydrazine-air fuel cell including the steps of:
   (A) placing a porous plaque of sintered nickel into an aqueous solution of ferrous chloride,
   (B) evacuating the air from the system,
   (C) shaking the plaque to remove excess solution,
   (D) immersing the plaque in an aqueous solution of sodium borohydride,
   (E) washing the plaque with hot distilled water until all traces of unreacted sodium borohydride and sodium chloride are removed, and (F) drying the plaque at a temperature of about 120 to 140° C. in a non-oxidizing atmosphere.

2. In a fuel cell having a housing, a fuel electrode and an oxidant electrode mounted in said housing in spaced relation to each other; an ion exchange resin membrane disposed between said electrodes; means for supplying a fuel to the fuel electrode and means for supplying an oxidant to the oxidant electrode; the improvement in which said fuel electrode includes an electrically conductive porous support having fine particles of iron powder randomly dispersed thereover and in the pores thereof.

References Cited

UNITED STATES PATENTS 2,737,541    3/1956    Coolidge.
3,183,123    5/1965    Haworth.
3,242,011    3/1966    Witherspoon.

WINSTON A. DOUGLAS, Primary Examiner

A. SKAPARS, Assistant Examiner

U.S. Cl. X.R.

136—120